No. 661,307. Patented Nov. 6, 1900.
T. C., T. A. & S. C. DARBY.
IMPLEMENT FOR CULTIVATING LAND.
(Application filed Dec. 21, 1899.)
(No Model.) 3 Sheets—Sheet 1.
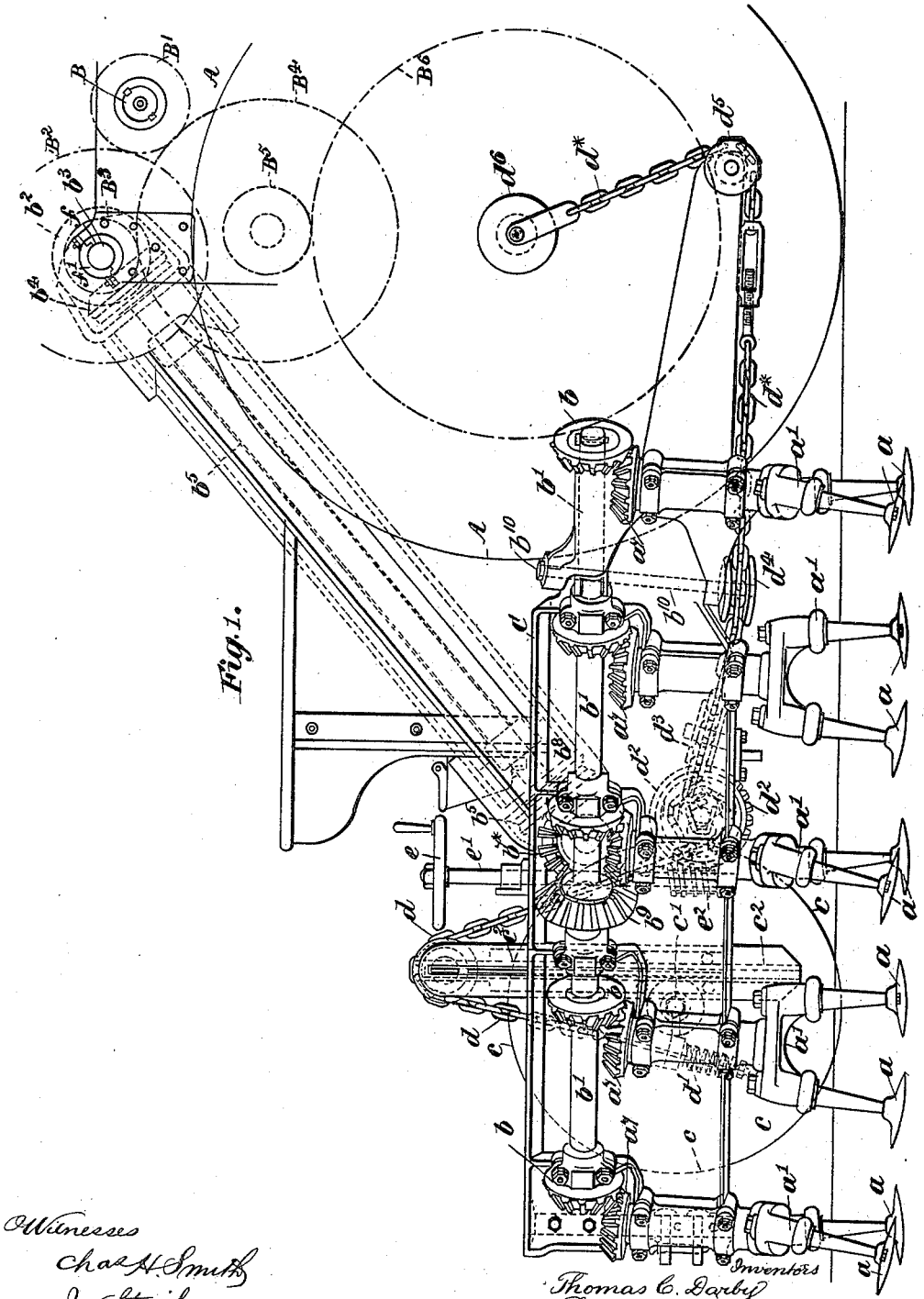

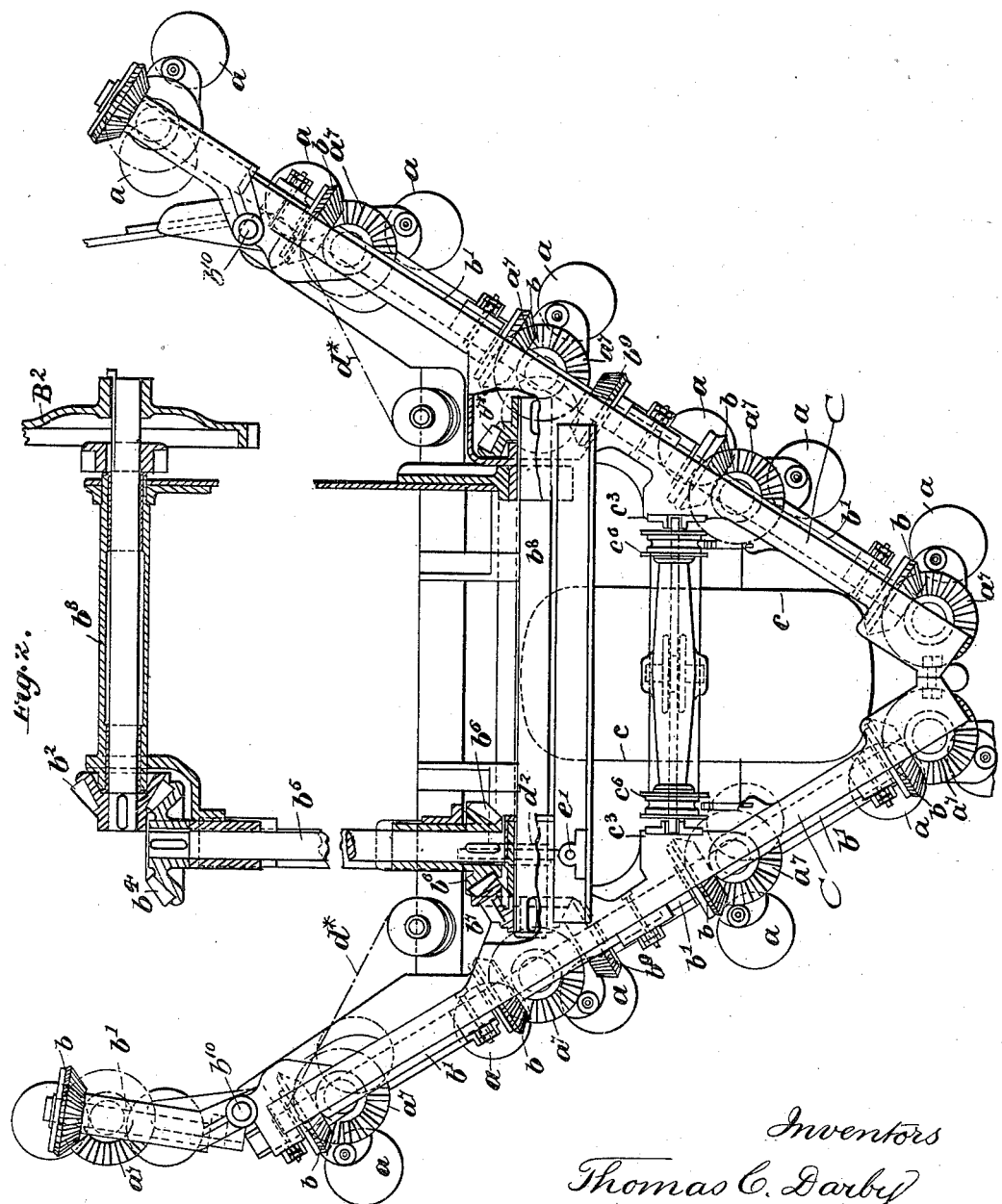

No. 661,307. Patented Nov. 6, 1900.
T. C., T. A. & S. C. DARBY.
IMPLEMENT FOR CULTIVATING LAND.
(Application filed Dec. 21, 1899.)
(No Model.) 3 Sheets—Sheet 3.
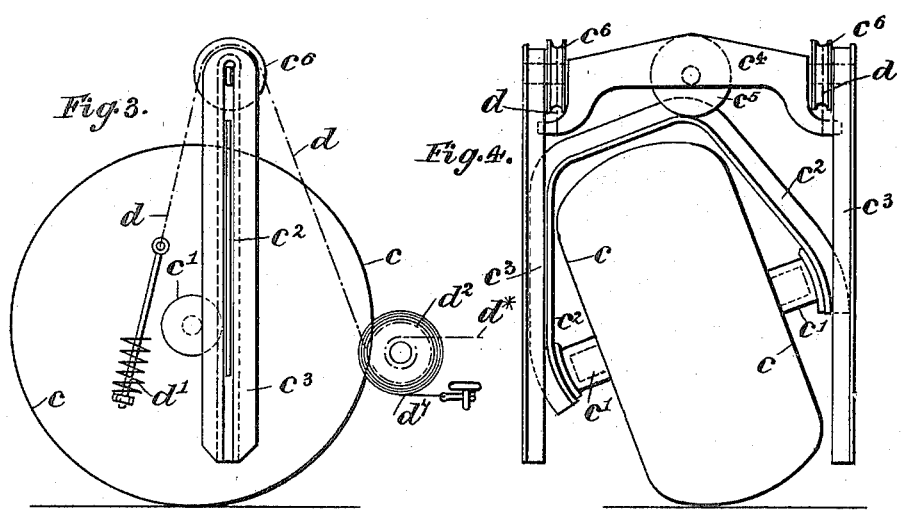
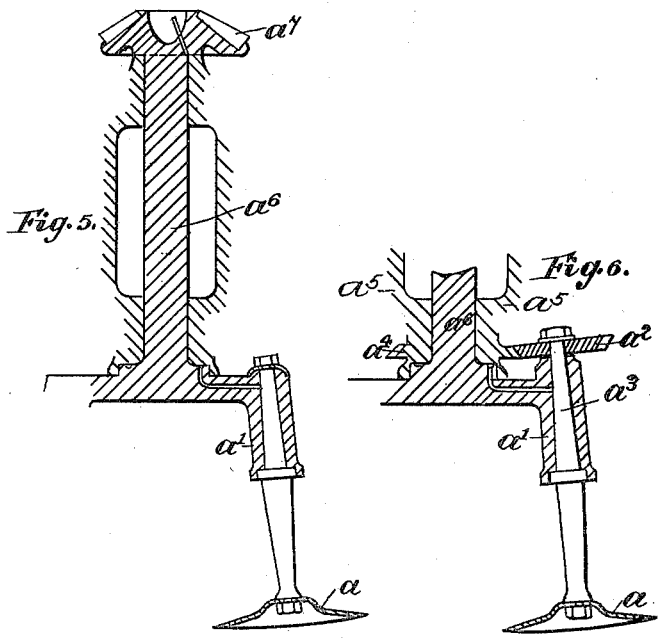
Witnesses
Chas H Smith
J. Staib
Inventors
Thomas C. Darby
Thomas A. Darby
Sidney C. Darby
per L. W. Serrell & Son
attys

UNITED STATES PATENT OFFICE.

THOMAS C. DARBY, THOMAS A. DARBY, AND SIDNEY C. DARBY, OF PLESHEY, ENGLAND.

IMPLEMENT FOR CULTIVATING LAND.

SPECIFICATION forming part of Letters Patent No. 661,307, dated November 6, 1900.

Application filed December 21, 1899. Serial No. 741,104. (No model.)

*To all whom it may concern:*

Be it known that we, THOMAS CHURCHMAN DARBY, THOMAS ALBERT DARBY, and SIDNEY CHARLES DARBY, subjects of the Queen of Great Britain, residing at Pleshey, in the county of Essex, England, have invented certain new and useful Improvements in Implements or Apparatus for Cultivating Land, of which the following is a full, clear, and exact description and for which we have made applications for patents in Great Britain, dated June 14, 1899, and in Germany, dated June 16, 1899.

The invention relates to that class of apparatus described in the specification of Letters Patent of the United States of America granted to Thomas Albert Darby and Sidney Charles Darby, No. 605,086, and dated June 7, 1898.

The invention is illustrated in the accompanying drawings, in which—

Figure 1 is a side elevation of the digging apparatus, showing the gear and rear wheels of the traction-engine diagrammatically. Fig. 2 is a plan of the digging apparatus, showing the shaft of the traction-engine from which it is driven. Fig. 3 is a side elevation, and Fig. 4 is a back view, of the steering-wheel of the digging apparatus. Fig. 5 is a detail view of one of the digging-tools, and Fig. 6 is a slight modification thereof.

A represents the rear wheels of the traction-engine, to which the digger is attached.

B is a shaft of the engine, which gives motion to the driving-wheels A by means of the toothed pinions and wheels $B'$ $B^2$ $B^3$ $B^4$ $B^5$ $B^6$ when the engine is used for digging; but when the engine is used for traction or other purposes the pinion $B'$ is moved along its shaft and gears direct with the toothed wheel $B^4$.

Instead of employing duck's-foot-shaped cutters we employ convex or slightly-conical hollow disks $a$, mounted on the lower ends of the forks $a'$. These convex disks $a$ are capable of turning upon their own axes, and when they come into contact with the ground are caused to turn by friction therewith. In some cases it may be found advisable to drive these disks $a$ around their own axes during the whole or part of the revolution of the forks. A convenient method of doing this is to mount a toothed wheel $a^2$ on the top of the axis $a^3$ of each disk $a$ and to fix a toothed wheel $a^4$ to some fixed part of the machine, preferably to the sleeve or bearing $a^5$, in which the central arm $a^6$ of the fork $a'$ rotates, as shown in Fig. 6. The two exterior toothed wheels $a^2$, only one of which is shown, gearing with the fixed toothed wheel $a^4$, will thus be caused to rotate when the fork is rotating. The fixed toothed wheel $a^4$ may be replaced by a curved rack on one side of the fork only, so that the exterior gear-wheels only receive motion during part of their revolution; but this is not shown in the drawings, as it is readily understood.

When it is desired to dig or stir the land to a greater depth than usual, we may attach two disks to each stem of the fork, one or both of which may be flat, one to stir the land near the surface and the other to stir the underneath portion, or we may attach one disk to one arm of the fork near the surface of the land and the other disk to the other arm of the fork at a lower depth. In this latter case the upper disk may be larger than the lower one, and the arm of the fork on which it is mounted may be farther from the axis of the fork.

We find that we are able to dig with less power when using disks instead of duck's-foot-shaped cutters, and another advantage is that we can dig backward and forward, which was impossible with the said cutters.

In the present invention the digging-forks are driven by bevel-wheels $a^7$ and bevel-wheels $b$, mounted on shafts $b'$, as in the specification above referred to; but the shafts $b'$ are driven by means of the bevel-pinion $b^2$, mounted on the shaft $b^3$, which gives motion to the bevel-pinion $b^4$, mounted at the top of an inclined shaft $b^5$, having a bevel-pinion $b^6$ fixed on its lower end which gears with the pinion $b^7$, mounted on the shaft $b^8$, passing across the machine and giving motion to the other side thereof by means of the bevel-pinion $b^{7*}$. The pinions $b^7$ $b^{7*}$ give motion to the shafts $b'$ by means of the pinions $b^9$.

The triangular or V-shaped digging-frame C is carried at its rear end by means of the wheel $c$, so mounted on its axis $c'$ that it will rock in a vertical plane to one side or the other when the traction-engine is being steered, and thus enable the digging part to move in the opposite direction to that in which the engine is being steered. The digging part of the apparatus will thus automatically follow the engine.

As seen in Fig. 4, the axis $c'$ is carried by a frame $c^2$, capable of rocking in vertical guides $c^3$, carried by the triangular or V-shaped digging-frame C. These guides $c^3$ are capable of sliding up and down upon the ends of a cross-bar $c^4$, in the center of which is mounted a roller $c^5$, running on the top of the frame $c^2$. The cross-bar $c^4$ carries at each end pulleys $c^6$, over which pass chains $d$, attached at their rear end to the digging-frame C by means of the spring $d'$, as seen in Fig. 1. These chains pass forward to pulleys $d^2$. Other chains $d^*$ pass from the pulleys $d^2$ around guide-pulleys $d^3$ $d^4$ $d^5$ to the dust-caps $d^6$ of the main wheels A of the engine. The pulleys $d^2$ are provided with springs $d^7$ to enable the lifting to be accomplished with greater ease, and they are operated by means of the hand-wheel $e$, shaft $e'$, and worm $e^2$. When the hand-wheel $e$ is rotated, it will operate all the chains simultaneously, and thus the depth of digging may be regulated or the digging-tools lifted clear of the ground.

When it is desired to use the traction-engine without the digger, it is only necessary to remove the cap $f'$ of the bearing $f$, to raise the inclined shaft $b^5$, and to disconnect the chains $d^*$ from the dust-cap $d^6$ in order to release the engine. The toothed wheel B' is moved along its shaft into gear with the wheel $D^4$, and the engine may then be taken away, leaving the digger stationary.

We prefer to form a hinged joint $b^{10}$ in each of the shafts $b'$ to enable the ends thereof to be moved inward for passing through gates and along roads.

What we claim as our invention, and desire to secure by Letters Patent, is—

1. In an implement for digging and cultivating land, and in combination, a digging-frame, vertical guides carried by said frame, a frame rocking in said vertical guides, an axle carried by the rocking frame and a carrying-wheel mounted on said axle, substantially as set forth.

2. In an implement for digging or cultivating land the combination with a V-shaped or diverging frame and rigid support therefor, of a series of approximately vertically placed axes, spaced apart in said frame, a series of forks and disks on the free ends thereof, carried by said axes, and means for simultaneously rotating the said axes with the forks and disks, substantially as set forth.

3. In an implement for digging or cultivating land the combination with a supporting-frame, of axes passing through said frame, forks connected to the lower ends of said axes, axes passing through the fork-arms, disks mounted on the ends of the said axes, means for rotating the forks and means for simultaneously rotating the axes and the disks, substantially as set forth.

4. In an implement for digging or cultivating land the combination with a supporting-frame, of axes passing through said frame, forks connected to the lower ends of said axes, axes passing through the fork-arms, disks mounted on the ends of said axes, means for rotating the forks, gears upon the axes of the disks and a fixed gear on the frame whereby the disks are rotated independent of the forks, substantially as set forth.

5. In an implement for digging or cultivating land, the combination of a V-frame, carrying-chains attached at one end to the engine, guide-pulleys for said chains attached to the V-frame, and spring-pulleys to which the other ends of the chains are attached and around which they can be wound, substantially as set forth.

6. In an implement for digging or cultivating land, the combination of a V-shaped digging-frame, vertical guides carried by said frame, a cross-bar sliding in the upper portions of said vertical guides, a roller mounted at the center of said cross-bar, pulleys mounted at the ends of said cross-bar, chains passing over said pulleys attached to the V-frame, a frame rocking in said vertical guides, an axle carried by the rocking frame, and a carrying-wheel mounted on said axle, substantially as set forth.

7. In an implement for digging or cultivating land, the combination of a main driving-shaft on an engine, toothed wheels and a cross-shaft receiving motion from said driving-shaft through the toothed wheels, a bevel-pinion mounted on said cross-shaft, an inclined shaft having a bevel-pinion at each end thereof, and driven by said cross-shaft, a cross-shaft mounted on the V-frame having a bevel-pinion on each end thereof and driven by the inclined shaft, shafts along each side of the V-frame, bevel-pinions on said shafts, rotating forks driven by said bevel-pinions and carried by the V-frame, and disks mounted on the ends of said rotating forks, substantially as set forth.

8. In an implement for digging or cultivating land the combination of a V-shaped or diverging frame, a series of revoluble forks and axes mounted in said frame and means for operating the same, of a hinge adjacent to each free end of said V-shaped frame, a separate end section to said frame connected to said hinge, a revoluble fork and disks mounted upon each of said sections and means for operating the same.

9. In an implement for digging or cultivating land, the combination with a V-shaped or diverging frame and shafts along each side thereof, a series of revoluble forks and disks mounted in said frame and means for operating same, of a hinge adjacent to each free end of said V-shaped frame, a separate end section to said frame connected to said hinge, a shaft-section in each end section adapted to couple with the ends of the aforesaid shafts, a revoluble fork and disks mounted upon each of said sections and means for operating the same.

10. In an implement for digging or cultivating land, the combination of a V-frame, carrying-chains attached at one end to the engine, guide-pulleys for said chains attached to the V-frame, spring-pulleys to which the other ends of the chains are attached and around which they can be wound, other chains also attached to said spring-pulleys and passing over pulleys to the rear part of the V-frame, a cross-bar carrying said pulleys, vertical guides attached to the V-frame in which the cross-bar slides, a roller mounted at the center of said cross-bar, a rocking frame on which said roller rests and which is controlled by vertical guides, an axle carried by the rocking frame, and a carrying-wheel mounted on said axle, substantially as shown and described.

In testimony whereof we affix our signatures in presence of two witnesses.

T. C. DARBY.
      T. A. DARBY.
      S. C. DARBY.

Witnesses:
 CLAUDE K. MILLS,
 H. SEYMOUR-MILLS.